Feb. 2, 1960 C. J. FITCH 2,923,920

INFORMATION STORAGE DEVICE

Filed Dec. 30, 1955

INVENTOR.
CLYDE J. FITCH

BY Paul M. Brannen

AGENT

United States Patent Office 2,923,920

Patented Feb. 2, 1960

2,923,920

INFORMATION STORAGE DEVICE

Clyde J. Fitch, Endicott, N.Y., assignor to International Business Machines Corporation, New York, N.Y., a corporation of New York Application December 30, 1955, Serial No. 556,503

7 Claims. (Cl. 340—173)

Figure 1A:
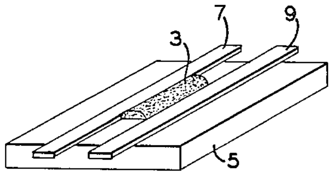

This invention relates to information storage devices and particularly to an improved device for storing binary information, in which the device is caused to assume one or the other of two stable states in accordance with the value of an electrical potential applied thereto, and which is capable of maintaining either of two stable states without the expenditure of energy. More particularly, this invention relates to a solid coherer, which may have one or the other of two stable states of electrical impedance and which is placed in these states by applications of suitable electrical potentials.

It has long been known that loose powders of certain types of conductive substances have the property of assuming a relatively low impedance upon the application thereto of a signal voltage, and thereafter maintaining this low impedance state until mechanically shocked or jarred, whereupon the impedance changes to some relatively higher value where it remains until another signal voltage is supplied. These devices, known in the art as "coherers," have been employed as detectors of electromagnetic radiation, particularly in the lower frequencies of the radio spectrum, and since they are essentially binary in nature, have also been proposed for use as binary-valued information storage devices.

However, when employed as binary storage devices, previous coherer devices have not been too satisfactory. A principal objection is the fact that such loose-powder coherers, although coherable by the action of a suitable potential, must be de-cohered by mechanically shocking or jarring the device, so as to break up the conductive chains established by the cohering action. Such mechanical de-cohering is suitable only in the case of large numbers of coherer elements which are to be de-cohered simultaneously, requires relatively complex and power-consuming electromechanical jarring means, and is essentially slow. A second objection is the fact that extraneous shocks, jars or vibrations of a loose powder coherer may cause unwanted de-coherence, or may prevent coherence.

Accordingly, an object of this invention is to provide an information storage device which is responsive in a first or a second manner to a first or a second potential supplied thereto.

Another object of this invention is to provide an information storage device having two stable values of electrical impedance in accordance with the value of potentials established across the element.

A further object of this invention is to provide an improved coherer having two stable states of electrical impedance and immune to mechanical shocks or vibrations.

Another object of the invention is to provide an improved coherer comprising a coherable substance in combination with an inert binder material, having suitable electrical connections, and having two stable states of electrical impedance.

Still another object of the invention is to provide an improved coherer comprising a coherable substance in combination with an inert plastic binder, having suitable electrical connections, and having two stable states of electrical impedance.

Other objects of the invention will be pointed out in the following description and claims and illustrated in the accompanying drawing, which discloses, by way of example, the principle of the invention and the best mode, which has been contemplated, of applying that principle.

Figure 1B:
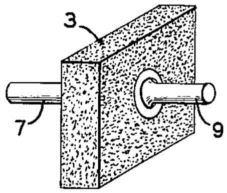
Figure 1C:
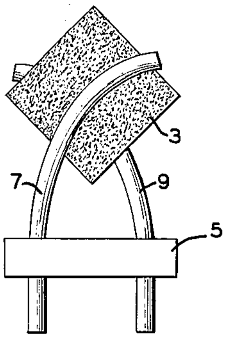
Figure 2:
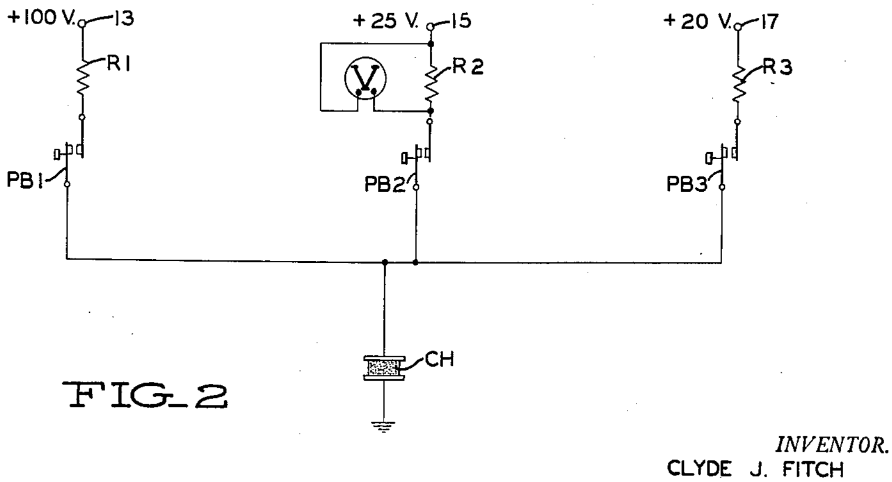

In the drawing:

Figs. 1*a*, 1*b* and 1*c* illustrate in diagrammatic form three different manners of construction of coherer units embodying the invention, and Fig. 2 is a diagrammatic view of one type of electrical circuit which may be employed with the devices constructed in accordance with the invention.

Similar reference characters refer to similar parts in each of the several views.

Briefly described, the present invention provides a solid type coherer in which a coherable substance is mixed with a suitable inert binder, to provide a substantially solid coherer body element. The coherable substance is preferably, but not necessarily, a powdered metal selected from a class of metallic elements or compounds characterized by having a lower melting point than their oxides, such as, for example, tin. The binder material is preferably, but not necessarily, selected from a class of electrically inert materials which may be mixed with the coherable substance and assumes after a period of time a solid or substantially solid state either of its own accord or by a suitable treatment. For example, the binder may be one of the well-known organic compounds known generally as plastics.

A suitable quantity of the coherable material is intimately mixed with the binder material, and the mixture is then solidified. Suitable electrical connections are established to opposite sides of small volumes of the material, either by placing a conductor in contact therewith, or by forming a conductive layer on opposite sides of the portion of the material. The resulting assembly may be provided with suitable terminals if desired, and may be encapsulated if desired.

Since any gross motion of the coherable particles is prevented as a result of the mixture therewith of the binder, it is apparent that the arrangement provided by the invention is immune to mechanical shocks or vibrations.

A particular characteristic of the present invention is the provision of electrical de-cohering or erasing of the device. As in previous coherers, a suitable electrical signal supplied thereto will cause the coherable substance to cohere, in which one or more conductive chains of coherable particles are established between the electrodes or terminals of the device. However, when it is desired to de-cohere the present device, an electrical signal is supplied to the terminals, which signal causes sufficient current to flow therethrough to cause electrical disruption of the conductive chains in the coherer unit. The phenomena of coherence and de-coherence is not thoroughly understood but it is believed that the cohering signal causes a welding of adjacent coherable particles into a conductive chain, whereas the higher current employed in the de-cohering operation generates sufficient heat to thermally explode the minute conductive bridges established between the particles.

The cohered or de-cohered state of the coherer device may be ascertained by connecting a relatively low voltage, low current source thereto, and directly or indirectly measuring the current which flows therethrough, which in turn is dependent upon the impedance of the unit at the time of measurement.

Considering now the details of the invention, it has been found that, in general, a number of substances will act as coherable materials, so that for the purpose of this description, the term coherable material is to be understood to mean any substance, usually granular in form, which, when exposed to a suitable electrical signal voltage, tends to form conductive chains of particles, such conductive chains being disrupted when a suitable current is caused to flow therethrough. Examples of such substances are powdered metals such as iron, tin, and aluminum, and powdered carbon. It is to be noted that with respect to the metallic coherable substances, best results are secured with those metals the oxides of which have a higher melting point than the pure metal, and the maximum size of the particles is of the order of 44 microns.

The binder with which the coherable substance is mixed may be of any suitable type which is substantially non-conductive and which may be cured by heat or evaporation to form a solid or semi-solid resultant mixture. Certain of the plastic materials are very well suited for this purpose, for example, the so-called epoxy resins, and the compounds known by their trade names as "Pliobond," "Resistoflex," and "Formvar." Preferably, but not necessarily, the binders which provide a relatively soft and resilient product give better results than those which give a hard and unyielding product.

In general, best results are obtained when the coherable substance and the binder are combined in a substantially 1 to 1 ratio by volume, although the proportions may be varied therefrom if desired. However, high concentrations of the coherable substance, of the order of 65% or higher, and low concentrations of the coherable substance, of the order of 30% or less, do not give reliable results.

It is to be noted that an inert filler material may be used, if desired, as a third ingredient, to decrease the amount of binder material. Examples of suitable filler materials are titanium dioxide powder, asbestos powder, magnesium dioxide, silica gel, and ferric oxide.

It has been found that improved performance is obtained if a very slight trace of detergent or anionic wetting agent, such as "Tergitol" (sodium tetra/hepta decyl sulfate), is added to those mixtures employing a water-soluble binder, since a more intimate mixing and coating of the coherable particles, and the filler particles if any, with the binder, is obtained.

In a preferred form of the invention, the composition of the aggregate is as follows, expressed as percentages by volume:

60% tin powder (maximum particle size—44 microns)
20% titanium dioxide
20% polyvinyl alcohol ("Resistoflex")
A small fraction of 1% of a suitable detergent, such as "Tergitol."

The aggregate is thoroughly mixed and then poured into suitable molds for solidification or curing, which may or may not employ heat treatment. Depending upon the particle size of the coherable material, and the filler material, if used, and depending further upon the viscosity of the binder material when in the fluid state, it may be necessary to tumble the molds during curing, or otherwise continually reorient them in different positions, to prevent the particles from settling or otherwise forming a heterogeneous solid.

A number of ways of mounting the coherer device and establishing electrical connections thereto will at once suggest themselves to those skilled in the art, a few of which are illustrated in Figs. 1*a*, 1*b*, and 1*c*. In Fig. 1*a*, a small amount of the fluid aggregate 3 is deposited on an insulating block 5, of any suitable material, between two conductors 7 and 9, to which electrical connections may be made. In Fig. 1*b*, a small wafer of the coherer aggregate 3 is provided with conductors 7 and 9 attached to opposite sides of the wafer by any suitable means, as by soldering to a metallic layer formed on each side of the wafer by electrodeposition or other well-known methods. In Fig. 1*c*, a wafer 3 is held between two conductors 7 and 9 formed to exert a pressure on opposite surfaces of the wafer, and mounted rigidly in a base or block 5 of suitable insulating material. The ends of conductors 7 and 9 extending below the base block 5 may be utilized as contact pins which engage mating contacts in a suitable socket, in the manner well-known in the electron tube manufacturing art. Any of the arrangements shown may, of course, be provided with a suitable envelope, or may be encapsulated by any of the well-known "potting" techniques, to protect the element from mechanical injury and render it less liable to damage by adverse atmospheric conditions.

Having thus described the manner of fabricating a coherer device in accordance with the invention, the operation of the device will now be described. As previously pointed out, a storage element according to the present invention has two stable states of electrical impedance, and may be changed from one state to the other by the application of suitable electrical potential thereto. Application of a high voltage and a low current to the device will cause coherence, so that the impedance of the device is established at some relatively low value. Application of a low voltage and a relatively high current to the device will cause de-coherence, so that the impedance of the device is established at some relatively high value. It follows therefore, that in utilizing the coherer element as an information storage device, an arbitrary binary value may be assigned to each of the impedance states, for example, a binary "zero" value may be assigned to the high impedance state, and a binary "one" value may be assigned to the low impedance state. A suitable high voltage-low current source provides a means for storing a "one" value, and a suitable low voltage high current means provides a means for resetting the device to a "zero" value. Storage of a one or a zero value is ascertained by a suitable impedance measuring means which provides two different responses in accordance with the high or low impedance state of the coherer. It is apparent that a wide variation is possible in the various types of apparatus which will meet the above requirements and the device is not limited to use with any specific form of auxiliary circuitry, since any type which fulfills the above requirements will suffice.

In Fig. 2, there is shown an elementary form of electrical circuit which illustrates the operation of the coherer device. As shown a coherer device CH, constructed in the manner previously described, has one of its terminals connected to a ground or negative potential terminal, and has its other terminal connected to one contact of each of three push buttons PB1, PB2, and PB3. Push button PB1, when operated, connects the ungrounded terminal of the coherer CH to a positive terminal 13 of a source of relatively high voltage, for example, of the order of 100 volts, with respect to ground. Resistor R1 acts as a current limiting resistor in this circuit and is selected to limit the current to some relatively small value, for example, of the order of 100 microamperes.

Push button PB2, when operated, connects coherer CH and resistor R2 in series between terminal 15 and ground, so that the potential between terminal 15 and ground, which may be of the order of 25 volts, is impressed on the circuit. Resistor R2 is chosen to limit the current in this circuit to an intermediate value, for example, of the order of 5 milliamperes. A voltmeter V is connected across resistor R2 so that the value of voltage drop across the resistor R2 may be determined. Since the reading of voltmeter V is dependent upon the value of current flowing through resistor R2 and the coherer CH, and since the value of this current is dependent upon the impedance of the coherer, it is seen that the reading of voltmeter V is directly related to the impedance of the coherer.

Push button PB3 when operated, connects the coherer CH and the resistor R3 in series between terminal 17 and ground. A relatively low voltage, say of the order of +20 volts is impressed on the circuit, and resistor R3 is chosen to permit a relatively high current, for example, of the order of 0.4 ampere, to flow in this circuit.

In operation, if push button PB1 is operated, high voltage, low current energy is supplied to the coherer CH, to thereby cause it to cohere, or if already cohered, to remain in the cohered state. The impedance of the coherer CH will accordingly have some relatively low value. This state may be thereafter ascertained by operation of push button PB2, whereupon voltmeter V will indicate a relatively high voltage drop across resistor R2, as a result of a relatively high current through the low impedance coherer.

With the coherer device CH set in its low impedance state as described above, the value of impedance may be repetitively determined, at any desired time, without changing the impedance of the coherer, by operation of push button PB2. It is apparent therefore, that the coherer device functions as a static storage element, which requires no external energy for maintaining the information stored therein, and which information is not lost as a result of interrogating the device for the value of information which it contains.

To reset the coherer device to its high impedance, or zero-representing state, push button PB3 is operated to send a relatively large current through the coherer device which disrupts the conductive chains therein and causes the impedance of the device to be established at its high value, which may be ascertained at any subsequent time by operating push button PB2 and noting the relatively small reading of the voltmeter.

From the foregoing it will be seen that an information storage device according to the present invention provides a coherer device having the advantages of immunity to mechanical shock, electrical read-in, sensing and erasing, and ease and economy of manufacture.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. An information storage device comprising, in combination, a body comprising a mixture of coherable particles bound in an insulating binder to form a solid homogeneous body, and electrode means for establishing electrical connections to said solid body.

2. An information storage device comprising, in combination, a body composed of a mixture of coherable particles and inert filler material bound in an insulating binder to form a solid homogeneous body, and electrode means for establishing electrical connections to opposite sides of said solid body.

3. An information storage device comprising, a mixture of coherable particles and an insulating binder material, said binder material being curable to a substantially solid state, and electrode means for establishing electrical connections to a cured body of said mixture.

4. An information storage device according to claim 3, further characterized by the inclusion in the mixture of an inert filler material.

5. An information storage device according to claim 4, further characterized by the inclusion in the mixture of a fraction of one percent by volume of anionic wetting agent.

6. An information storage device comprising, in combination, a body compound of a mixture of tin powder, an inert filler material and a plastic binder material, in proportions of 60%, 20%, and 20% by volume respectively, and having electrode means for establishing electrical connections to said body element.

7. An information storage device as claimed in claim 6 further characterized by said mixture including a fraction of one percent of anionic wetting agent.

References Cited in the file of this patent

UNITED STATES PATENTS

| | | |
|---|---|---|
| 2,592,683 | Gray | Apr. 15, 1952 |
| 2,778,762 | Eisler | Jan. 22, 1957 |

OTHER REFERENCES

Quarterly Report No. 3 of the Computer Components Fellowship No. 347, published by Mellon Institute of Industrial Research April 11, 1951 to July 11, 1951 (Section III, 10 pages, 1–10 relied on).